(12) United States Patent
Sasaki

(10) Patent No.: US 7,196,729 B2
(45) Date of Patent: Mar. 27, 2007

(54) AF EVALUATION VALUE CALCULATING DEVICE

(75) Inventor: Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 862 days.

(21) Appl. No.: 10/364,378

(22) Filed: Feb. 12, 2003

(65) Prior Publication Data

US 2003/0160885 A1 Aug. 28, 2003

(30) Foreign Application Priority Data

Feb. 26, 2002 (JP) ............................. 2002-049603

(51) Int. Cl.
*H04N 13/00* (2006.01)
*G03B 3/00* (2006.01)

(52) U.S. Cl. .................... 348/345; 348/354; 396/89

(58) Field of Classification Search .................... None
See application file for complete search history.

(56) References Cited

U.S. PATENT DOCUMENTS

| | | | | |
|---|---|---|---|---|
| 4,967,280 A | * | 10/1990 | Takuma et al. | 348/355 |
| 4,985,777 A | * | 1/1991 | Kawada | 348/353 |
| 5,182,657 A | * | 1/1993 | Sato et al. | 348/356 |
| 5,467,161 A | * | 11/1995 | Odaka | 396/121 |
| 5,664,238 A | | 9/1997 | Nishiyama | |
| 6,683,642 B1 | * | 1/2004 | Kobayashi et al. | 348/231.99 |
| 6,876,391 B1 | * | 4/2005 | Hashimoto | 348/354 |

FOREIGN PATENT DOCUMENTS

| | | |
|---|---|---|
| JP | 7-218840 | 8/1995 |
| JP | 08-214202 | 8/1996 |
| JP | 9-90212 | 4/1997 |
| JP | 10-213843 | 8/1998 |
| JP | 11-142725 | 5/1999 |
| JP | 11-298786 | * 10/1999 |
| JP | 2001-56429 | 2/2001 |
| JP | 2001-116979 | 4/2001 |
| JP | 2001-346086 | 12/2001 |

* cited by examiner

*Primary Examiner*—David Ometz
*Assistant Examiner*—Nhan T. Tran
(74) *Attorney, Agent, or Firm*—Oblon, Spivak, McClelland, Maier & Neustadt, P.C.

(57) ABSTRACT

The present invention provides an AF evaluation value calculating device in which speed of AF control does not deteriorate even when a number of AF areas are set. The AF evaluation value calculating device for calculating an AF evaluation value used for AF (auto-focus) control of a digital camera, includes: at least one AF evaluation value calculating unit 13 for calculating an AF evaluation value in each of a plurality of AF areas which are set in an image area of image data supplied; and a data transmitter (17a and ch0) for transmitting the AF evaluation value calculated by the AF evaluation value calculator 13 into a predetermined memory by DMA (Direct Memory Access).

9 Claims, 8 Drawing Sheets

AF EVALUATION VALUE CALCULATING DEVICE

BACKGROUND OF THE INVENTION

1. Field of the Invention

The present invention relates to an AF evaluation value calculating device for calculating an AF evaluation value used for AF (auto-focus) control of a digital camera.

2. Description of the Background Art

In the AF control of a digital camera, so-called "hill-climbing method" is generally employed. The hill-climbing method is a method of using, as a focus position, a lens position at which the maximum AF evaluation value among AF evaluation values in captured images at different lens positions along the optical axis direction is obtained. A digital camera of this kind therefore has an AF evaluation value calculating device for calculating an AF evaluation value.

Usually, the AF evaluation value is calculated by integrating contrast values of pixels in an AF area which is set in an image capturing area, so that the AF evaluation value calculating device has an accumulator for integrating contrast values. A conventional AF evaluation value calculating device has accumulators for integrating contrast values of the number equal to the number of AF areas which are set in the image capturing area.

In the AF control, the maximum AF evaluation value among AF evaluation values in lens positions is calculated, that is, the AF evaluation values are compared with each other, so that the AF evaluation values in the lens positions have to be transmitted and stored to a memory. In the conventional AF evaluation value calculating device, transmission of the AF evaluation values to the memory is controlled by a CPU on a digital camera side which performs AF control.

Conventionally, the number of AF areas which are set in the image capturing area ranges from one to about five at the maximum. FIGS. 8 and 9 show examples in each of which four AF areas A00, A01, A10 and A11 are set in the image capturing area. Since the number of AF areas is conventionally small, in the conventional AF evaluation value calculating device, the accumulators for integrating the contrast values do not cause increase in the size of the apparatus and power consumption, and deterioration in speed of the AF control due to excessive consumption of the processing power of the CPU for transmitting the AF evaluation values to the memory.

In recent years, however, there is a tendency that the larger number of AF areas are set in the image capturing area. Due to the tendency, the number of accumulators for integrating contrast values becomes too large and it causes problems such that the size of the AF evaluation value calculating device is increased, power consumption is increased, and the speed of the AF control deteriorates due to excessive consumption of the processing power of the CPU by transmission of AF evaluation values.

SUMMARY OF THE INVENTION

In order to solve the above problems, according to a first aspect of the present invention, an AF evaluation value calculating device for calculating an AF evaluation value used for AF (auto-focus) control of a digital camera, includes: at least one AF evaluation value calculator for calculating an AF evaluation value in each of a plurality of AF areas which are set in an image area of image data supplied; and a data transmitter for transmitting the AF evaluation value calculated by the AF evaluation value calculator to a predetermined memory by DMA (Direct Memory Access).

According to the first aspect of the present invention, since the AF evaluation value calculated by the AF evaluation value calculator is DMA transmitted from the AF evaluation value calculator to a predetermined memory by the data transmitter, the processing power of the CPU for performing AF control is not consumed by the transmission of the AF evaluation value, and deterioration in the speed of the AF control can be therefore prevented. Further, the data transmitter employs the DMA method, so that it can be easily constructed.

According to a second aspect of the present invention, the memory is a main memory for temporarily storing a captured image, which is provided for the digital camera.

According to the second aspect of the present invention, the calculated AF evaluation value is stored into the main memory of the digital camera, that is, the main memory also serves as the memory for storing the AF evaluation value, so that the memory space can be reduced (that is, increase in the size of the AF evaluation value calculating device can be prevented). Even when the number of AF evaluation values increases, memory shortage can be prevented. Therefore, even when a number of AF areas are set and a so-called "all area scan method" is employed, both the smaller size of the AF evaluation value calculating device and the higher speed of the AF control of the digital camera can be realized.

According to a third aspect of the present invention, the plurality of AF areas are set in a matrix, and the AF evaluation value calculator includes: accumulators of the same number as the number of columns of the matrix; a filtering part for extracting a predetermined frequency response component from the image data supplied; and a processor for integrating the image data supplied via the filtering part in each of the AF areas of a row by using the accumulators to calculate the AF evaluation value in each of the AF areas of the row and, before the image data included in the next row is supplied, outputting the AF evaluation value calculated to the data transmitter.

According to the third aspect of the present invention, AF evaluations values of all of the AF areas are calculated by the accumulators of the same number as that of columns in the matrix of the AF area, so that even when a number of AF areas are set, the number of accumulators may be small, and increase in the size of the AF evaluation value calculating device and increase in power consumption can be prevented.

According to a fourth aspect of the present invention, the processor outputs only high order bits of each of the calculated AF evaluation values to the data transmitter and transmits the upper bits to the memory via the data transmitter.

According to the fourth aspect of the present invention, only the high order bits of each AF evaluation value calculated are outputted to the data transmitter and transmitted to the memory via the data transmitter. Thus, the amount of data to be transmitted can be reduced, the transmission speed can be increased, and the storage area of AF evaluation values in the main memory can be reduced.

According to a fifth aspect of the present invention, the processor has one adder for integration and uses the adder to calculate the AF evaluation value in each of the AF areas in a time sharing manner.

According to the fifth aspect of the present invention, since one adder is used for calculating AF evaluation values in the AF areas in the row supplied in a time sharing manner, only by a single adder, the AF evaluation values in the AF areas in the row can be calculated and it contributes to prevention of increase in the size of the AF evaluation value calculating device and increase in power consumption.

According to a sixth aspect of the present invention, the processor has an adder for integration for each of the accumulators.

According to the sixth aspect of the present invention, each accumulator has the adder for integration, so that integration can be executed in AF areas in the same row at the same time. Consequently, there is an advantage that the AF areas in the same row can be set so as to be superposed with each other.

According to a seventh aspect of the present invention, at least one AF evaluation value calculator includes a plurality of AF evaluation value calculators, and the AF evaluation value calculators have filtering parts for extracting a frequency response component from the image data supplied by computing methods which are different from each other, and calculate the AF evaluation values of different characteristics by using the frequency response components extracted by the filtering parts.

According to the seventh aspect of the present invention, when frequency response components extracted by computing methods which are different from each other are used in the AF evaluation value calculators, AF evaluation values of characteristics which are different from each other are calculated. Thus, by selectively using the AF evaluation values of different characteristics in accordance with a subject, the optimum focus position can be obtained according to the subject.

According to an eighth aspect of the present invention, at least one AF evaluation value calculator includes a plurality of AF evaluation value calculators, and the AF evaluation value calculators have filtering parts for extracting frequency response components of bandwidths which are different from each other from the image data supplied, and calculate the AF evaluation values of different characteristics by using the frequency response components extracted by the filtering parts.

According to the eighth aspect of the present invention, when frequency response components of bandwidths which are different from each other are used in the AF evaluation value calculators, AF evaluation values of characteristics which are different from each other are calculated. Thus, by selectively using the AF evaluation values of different characteristics in accordance with a subject, the optimum focus position can be obtained according to the subject.

According to a ninth aspect of the present invention, at least one AF evaluation value calculator includes a plurality of AF evaluation value calculators, and the AF evaluation value calculators have filtering parts for extracting frequency response components from the image data supplied by using the filters having pixel correlation characteristics which are different from each other, and calculate the AF evaluation values of different characteristics by using the frequency response components extracted by the filtering parts.

According to the ninth aspect of the present invention, when frequency response components extracted by filters having pixel correlation characteristics which are different from each other are used in the AF evaluation value calculators, AF evaluation values of characteristics which are different from each other are calculated. Thus, by selectively using the AF evaluation values of different characteristics in accordance with a subject, the optimum focus position can be obtained according to the subject.

According to a tenth aspect of the present invention, the filtering part has a register for temporarily storing the image data supplied, and the register also serves as a register for temporarily storing a captured image used by an image process of the digital camera.

According to the tenth aspect of the present invention, since the register provided for the filtering part also serves as the register used by an image process of the digital camera. Thus, the total number of register groups can be reduced, so that reduction in size of the digital camera and reduction in power consumption can be realized.

An object of the present invention is to provide an AF evaluation value calculating device in which speed of AF control does not deteriorate even when a number of AF areas are set. Another object of the present invention is to provide an AF evaluation value calculating device capable of reducing the size and power consumption of the device.

These and other objects, features, aspects and advantages of the present invention will become more apparent from the following detailed description of the present invention when taken in conjunction with the accompanying drawings.

DESCRIPTION OF THE PREFERRED EMBODIMENT

Embodiment

Figure 1:
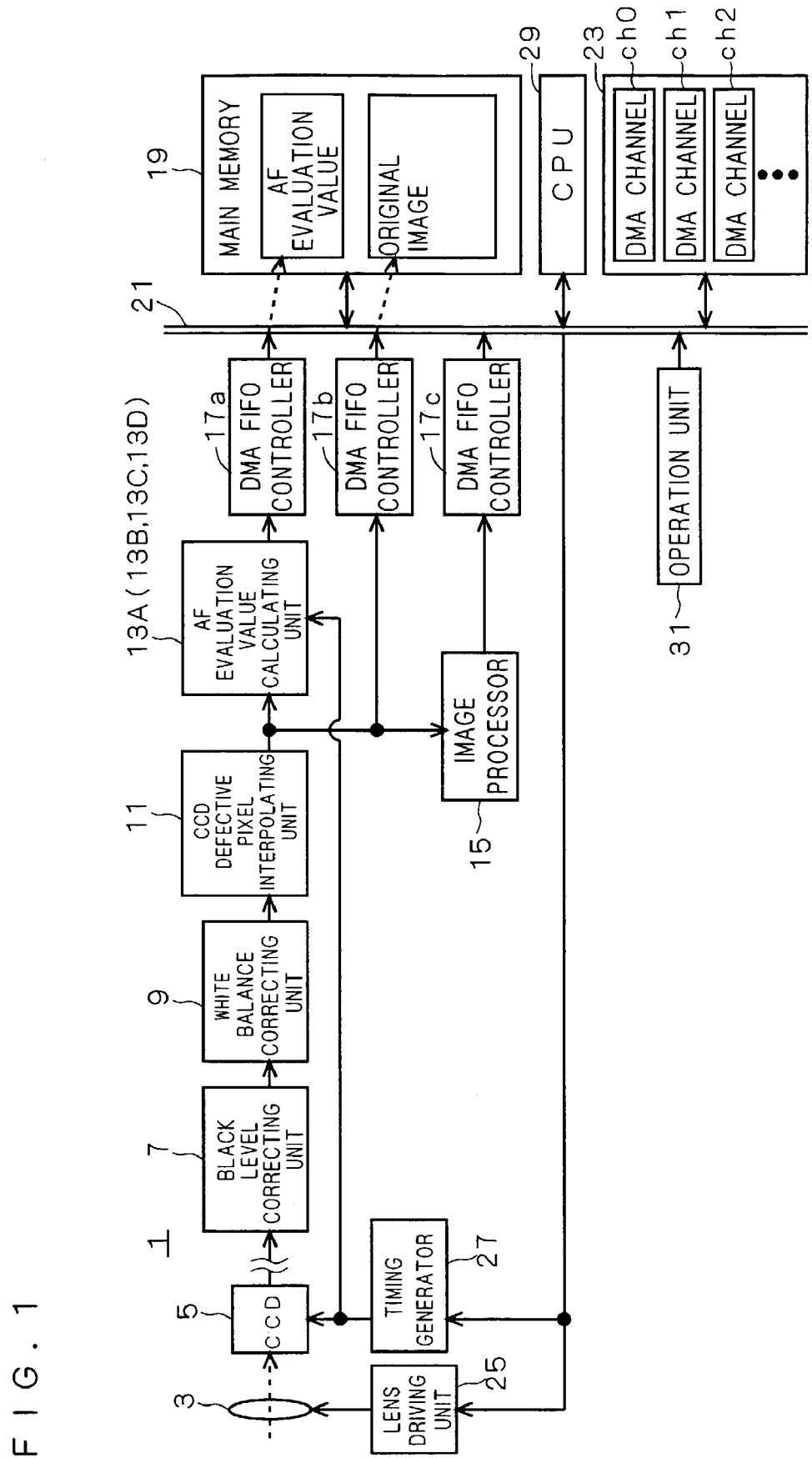
FIG. 1 is a schematic configuration diagram of a digital camera in which an AF evaluation value calculating device according to an embodiment of the present invention is mounted.
Figure 2:
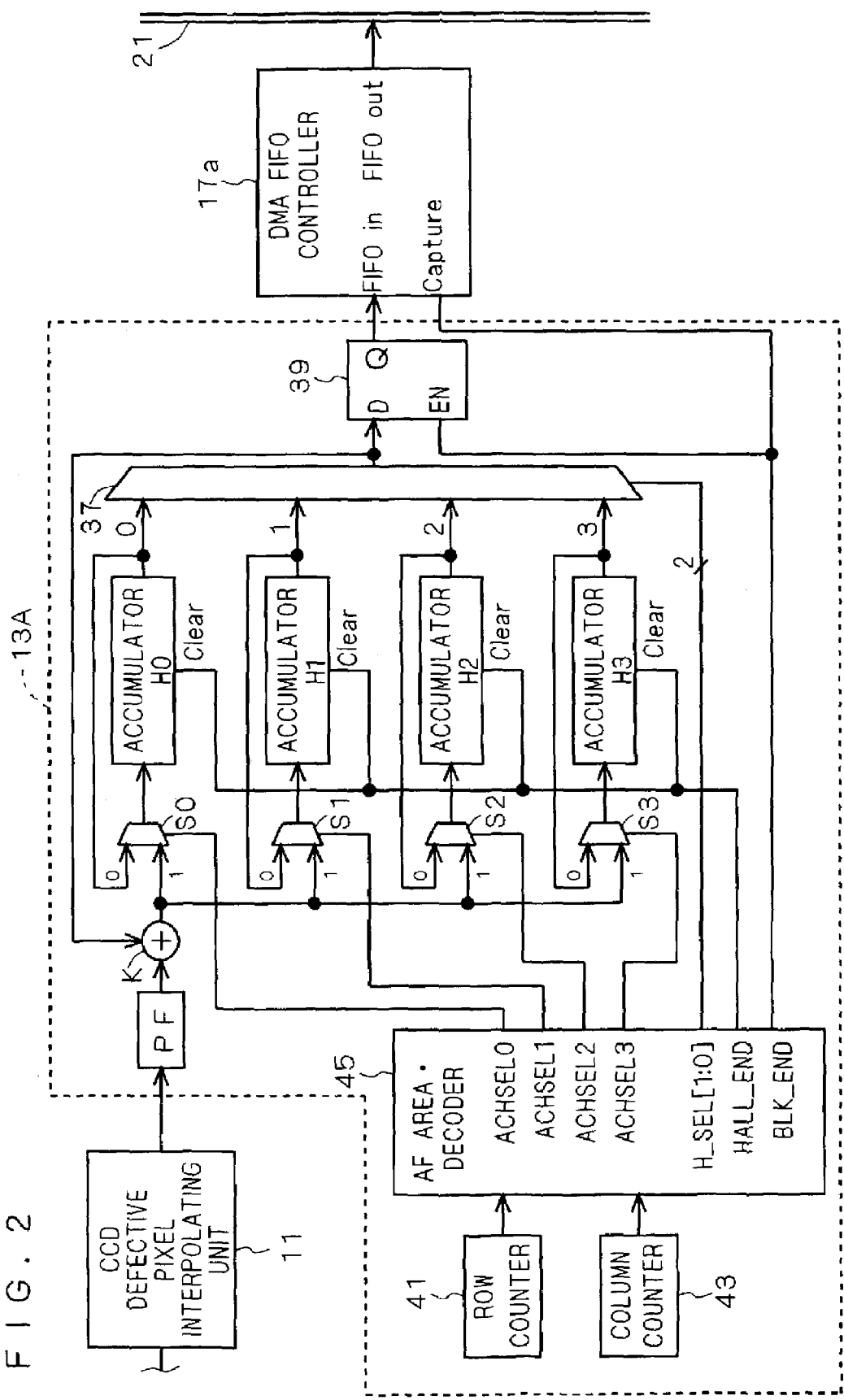
FIG. 2 is a schematic configuration diagram of an AF evaluation value calculating unit in FIG. 1.
Figure 3:
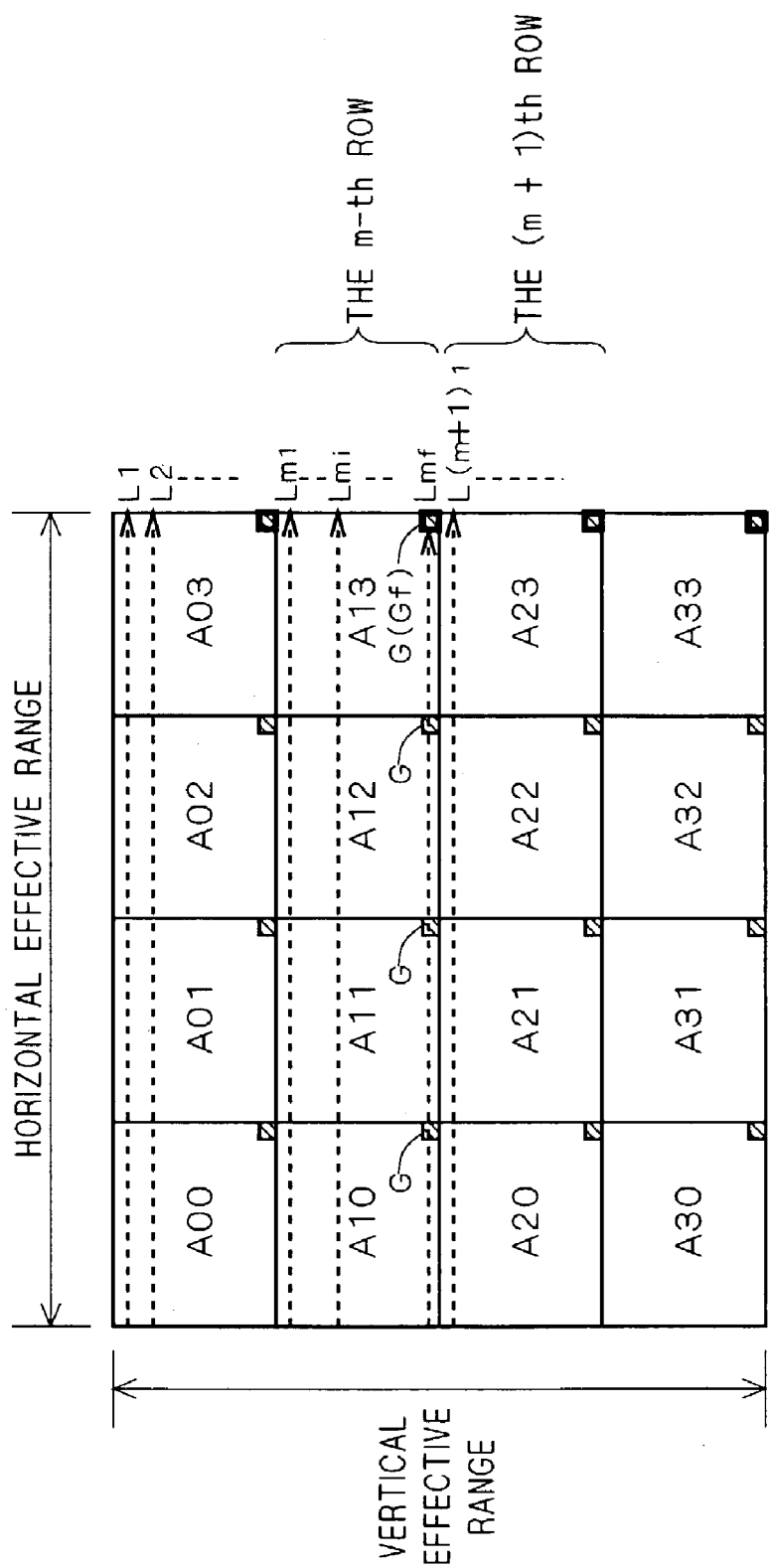
FIG. 3 is a diagram showing an example of setting an AF area in the digital camera of FIG. 1.

FIG. 1 is a schematic configuration diagram of a digital camera in which an AF evaluation value calculating device according to an embodiment is mounted. FIG. 2 is a schematic configuration diagram of an AF evaluation value calculating unit in FIG. 1. FIG. 3 is a diagram showing an example of setting of an AF area in the digital camera of FIG. 1.

As shown in FIG. 1, a digital camera 1 in an embodiment is constructed mainly by: a taking lens 3; a CCD 5; an A/D converter (not shown) for converting image data of an image captured by the CCD 5 via the taking lens 3 into digital image data; a black level correcting unit 7 for performing black level correction on image data from the A/D converter; a white balance correcting unit 9 for performing white balance correction on image data from the black level correcting unit 7; a CCD defective pixel interpolating unit 11 for performing a process of interpolating defective pixel data of a defective pixel portion of the CCD 5 in the image data from the white balance correcting unit 9 by using pixel data of peripheral pixels of the defective pixel; an AF evaluation value calculating unit 13A for calculating an AF evaluation value in an AF area which is set in an image area by using image data from the CCD defective pixel interpolating unit 11; an image processing unit 15 for performing the process of pixel interpolation or the like on image data from the CCD defective pixel interpolating unit 11, thereby generating image data for recording or the like; DMA FIFO controllers 17a, 17b and 17c for temporarily storing results of the processes in the elements 11, 13A and 15; a main memory 19 such as an SRAM; a DMA controller 23 for controlling data transmission between the DMA FIFO controllers 17a, 17b and 17c and the main memory 19 via a memory bus 21; a lens driving unit 25 for displacing the position of the taking lens 3; a timing generator 27 for generating clock signals for synchronizing the operations of the elements 5, 13A and the like; a CPU 29 for performing centralized control on the elements 13A, 25, 27 and the like; and an operation unit 31.

The DMA controller 23 is constructed mainly by DMA channels ch0 to ch2 for transmitting data between the elements 17a to 17b and 19, and an arbitration circuit (not shown) for arbitrating the transmission order of the DMA channels ch0 to ch2. The transmission source and the transmission destination of each of the DMA channels ch0 to ch2 are set as follows.

(1) DMA channel ch0
DMA FIFO controller 17a→ Main memory 19

(2) DMA channel ch1
DMA FIFO controller 17b→ Main memory 19

(3) DMA channel ch2
DMA FIFO controller 17c→ Main memory 19

In the embodiment, an AF evaluation value calculating device is constructed by the DMA FIFO controller 17a, DMA channel ch0 and AF evaluation value calculating unit 13A. By the DMA FIFO controller 17a and the DMA channel ch0, a DMA (Direct Memory Access) is constructed.

In the embodiment, in each of images captured by the CCD 5, as shown in FIG. 3, the whole effective area of the image is divided into, for example, 16 blocks as a matrix of 4 rows and 4 columns and total 16 AF areas Amn (m, n=0 to 3) obtained by the 16 blocks Amn (m, n=0 to 3) are set (hereinafter, the AF areas Amn will be referred to as matrix Amn as necessary).

As shown in FIG. 3, the CCD 5 sequentially scans pixel data of a captured image in order of horizontal lines L1, L2, . . . Consequently, the pixel data of the captured image is scanned in order from a start line $Lm_1$ to a final line $Lm_f$ (m: the row number) of each of the rows in the matrix Amn and the data is sequentially supplied to the elements 7, 9, 11, 13A and 15 (particularly, the AF evaluation value calculating unit 13A).

The AF evaluation value calculating unit 13A calculates an AF evaluation value for each of the AF areas Am0, Am1, Am2 and Am3 (m: row number) of each row supplied of pixel data of a captured image which is scanned every row of the matrix Amn and supplied from the CCD defective pixel interpolating unit 11 and outputs the calculated AF evaluation value to the DMA FIFO controller 17a before pixel data of the next row is supplied, thereby calculating AF evaluation values in all of the AF areas Amn (m, n=0 to 3) by using accumulators of the same number (four in this case) as the number of columns in the matrix Amn. As shown in FIG. 2, the AF evaluation value calculating unit 13A has a frequency pass filter PF, an adder K, accumulators H0 to H3 and selectors S0 to S3 each of the same number as the number of columns of the matrix Amn, a selector 37, a D flip flop circuit 39, a row counter 41, a column counter 43, and an AF area decoder 45.

The frequency pass filter PF (hereinafter, referred to as filter PF) takes the form of, for example, a high pass filter for extracting high frequency response components (which are dealt as contrast values of the pixel) from pixel data outputted from the CCD defective pixel interpolating unit 11 and outputting the components to the adder K. A simple high pass filter generates outputs of positive and negative signals. Consequently, when the output signals are accumulated, they are canceled out. In the case of using the output signals for the purpose of such AF, the output signals are set as absolute values before being outputted.

The adder K adds the contrast value of each pixel outputted from the filter PF with an integrated value of contrast values which will be described later from the accumulators H0, H1, H2 and H3 selectively outputted from the selector 37 and outputs the resultant value as a new integrated value to each of the selectors S0 to S3. A simple high pass filter generates outputs of positive and negative signals. Consequently, when the output signals are accumulated, they are canceled out. In the case of using the output signals for the purpose of such AF, the output signals are set as absolute values before being outputted.

The selector S0 (S1, S2 or S3) receives the integrated value from the adder K and the integrated value from the accumulator H0 (H1, H2 or H3) and, according to control from an output terminal ACHSEL0 (ACHSEL1, ACHSEL2 or ACHSEL3) of the AF area decoder 45, selectively outputs one of the integrated values to the accumulator H0 (H1, H2 or H3).

The accumulator H0 (H1, H2 or H3) switches its storage state between "clear" and "store" in accordance with control from an output terminal HALL_END of the AF area decoder 45. In the "store" state, the accumulator H0 (H1, H2 or H3) stores an integrated value from the selector S0 (S1, S2 or S3) as a new integrated value and outputs the new integrated value to the selector S0 (S1, S2 or S3) and the selector 37. In the "clear" state, the accumulator H0 (H1, H2 or H3) clears the integrated value to be stored and outputs zero value to the selector S0 (S1, S2 or S3) and the selector 37.

According to control from an output terminal H_SEL[1:0] of the AF area decoder 45, the selector 37 selectively outputs one of integrated values from the accumulators H0 to H3 to the adder K and the D flip flop circuit 39.

The operation/stop of the D flip flop circuit 39 is switched by the control from an output terminal BLK_END of the AF area decoder 45. At the time of the operation, the D flip flop circuit 39 outputs, as an AF evaluation value, an integrated value from the accumulators H0, H1, H2 and H3 selectively outputted from the selector 37 to the DMA FIFO controller 17a. At the time of stop, the D flip flop circuit 39 stops its output.

The row counter 41 and column counter 43 count the number of rows and columns, respectively, in the pixel array of a captured image, of each pixel data outputted from the filter PF to the adder K on the basis of clock signals from the timing generator 27.

The operation/stop of the AF area decoder 45 is switched by the control from the CPU 29. In the operation mode, referring to FIG. 3, during a period in which pixel data included in the AF area Am0 (Am1, Am2 or Am3) out of the pixel data on a horizontal line $Lm_i$ of the m-th row of the matrix Amn is outputted from the filter PF to the adder K on the basis of counting of each of the counters 41 and 43, each time pixel data is outputted, the AF area decoder 45 controls the elements S0 to S3, H0 to H3, 37 and 39 as follows.

Referring to FIG. 2, the AF area decoder 45 allows the selector 37 to select the integrated value from the accumulator H0 (H1, H2 or H3) and output it to the adder K and the D flip flop circuit 39. The integrated value from the selector 37 and the pixel data (that is, contrast value) from the filter PF are integrated by the adder K, and a new integrated value is outputted to each of the selectors S0 to S3. The AF area decoder 45 allows the selector S0 (S1, S2 or S3) to select an integrated value from the adder K and output it to the accumulator H0 (H1, H2 or H3) and, on the other hand, allows the selectors S0 to S3 other than the selector S0 (S1, S2 or S3) to select integrated values from the accumulators H0, H1, H2 and H3 at the post stage and output the integrated values to the accumulators H0, H1, H2 and H3 at the post stage. The accumulators H0, H1, H2 and H3 are not cleared and are allowed to store integrated values from the selectors S0, S1, S2 and S3 at the ante stage as new integrated values, and output the stored integrated values to the selector 37 and the selectors S0, S1, S2 and S3 at the ante stage. The AF area decoder 45 stops the D flip flop circuit 39 so that an output of the selector 37 is not outputted to the DMA FIFO controller 17a.

The contrast values of pixels included in the AF area Am0 (Am1, Am2 or Am3) on the horizontal line $Lm_i$ of the m-th row are integrated and the integrated value is stored in the accumulator H0 (H1, H2 or H3). By repeating similar control on each of the horizontal lines from the start line $Lm_i$ to the final line $Lm_f$ of the m-th row, the contrast values of all of pixels included in the AF area Am0 (Am1, Am2 or Am3) of the m-th row are integrated and the integrated value is stored in the accumulator H0 (H1, H2 or H3).

In the final line $Lm_f$ of the m-th row, when the pixel data of the final pixel G of the AF area Am0 (Am1, Am2 or Am3) is outputted from the filter PF to the adder K, the D flip flop circuit 39 is operated to output, as an AF evaluation value in the AF area Am0 (Am1, Am2 or Am3), the integrated value from the accumulator H0 (H1, H2 or H3) selectively outputted from the selector 37 to the DMA FIFO controller 17a.

Further, when pixel data of the final pixel Gf(G) of the final line $Lm_f$ of the m-th row is outputted from the filter PF to the adder K, the integrated values stored in the accumulators H0, H1, H2 and H3 are cleared, and the zero value is outputted from the accumulators H1, H2, H3 and H4 to the selector 37 and the selectors S0, S1, S2 and S3 at the ante stage of the accumulators H1, H2, H3 and H4. In such a manner, calculation of the AF evaluation values in the AF areas Am+10, Am+11, Am+12 and Am+13 in the next (m+1)th row is prepared.

By repeating the control on each of the 0th to 3rd rows of the matrix Amn, the AF evaluation values in all of the AF areas Amn (m, n=1 to 3) which are set in a captured image are calculated.

The DMA FIFO controller 17a temporarily stores an AF evaluation value outputted from the D flip flop circuit 39 in accordance with the control from the output terminal BLK_END of the AF area decoder 45 and transmits and stores the temporarily stored AF evaluation value to the main memory 19 in accordance with the control of the DMA channel ch0. Like in the conventional technique, each of the AF evaluation values is associated with the lens position of the taking lens 3 at which the AF evaluation value is obtained and stored into the main memory 19.

When an operation instruction of starting the AF control is received via the operation unit 31, the CPU 29 controls the elements 13A, 25 and 27 to execute the AF control of, for example, a so-called "all-area scan method". Specifically, while allowing the taking lens 3 to scan the whole area step by step in the optical axis direction by controlling the elements 25 and 27, the CPU 29 forms an image of the subject at each lens position by the CCD 5. With respect to each of captured images supplied from the CCD 5 to the AF evaluation value calculating unit 13A via the elements 7, 9 and 11, the CPU 29 controls the AF evaluation value calculating unit 13A to calculate the AF evaluation values in the whole AF area Amn (m, n=1 to 3) which is set in each of the captured images and output the evaluation values to the element 17a. The AF evaluation value outputted to the element 17a is transmitted and stored to the main memory 19 via the DMA channel ch0. In such a manner, all of the AF evaluation values of the image captured at each lens position are stored into the main memory 19.

The CPU 29 detects the maximum value of the AF evaluation values in an AF area (for example, AF area A11) designated by operation of the operation unit 31, of each captured image from the main memory 19 and controls the lens driving unit 25 to position the taking lens 3 to the lens position (focus position) associated with the detected AF evaluation value.

As described above, according to the all area scanning method, all of the AF evaluation values in the captured image at the lens positions are stored into the main memory 19 and the maximum AF evaluation value among all of the AF evaluation values is detected, thereby obtaining the focus position, so that the focus position can be detected at once. Consequently, there is an advantage that the taking lens 3 can be positioned in the focus position at once (that is, the speed of the AF control can be increased).

When the operation instruction of starting the image capturing operation is received via the operation unit 31, the CPU 29 controls the elements 15 and 27 to execute the image capturing operation. Specifically, the CPU 29 controls the element 27 to form an image of the subject via the taking lens 3 by the CCD 5. By controlling the image processing unit 15 to perform a required image process such as pixel interpolating process on the captured image outputted from the CCD 5 to the image processing unit 15 via the elements 7, 9 and 11, image data for recording is generated. The image data is outputted to the element 17c. The image data outputted to the element 17c is stored into the main memory 19 via the DMA channel ch2.

The operation of the digital camera 1 will now be described.

When the operation of starting the AF control is instructed via the operation unit 31, the elements 25 and 27 are controlled by the CPU 29 so that the taking lens 3 scans the whole area step by step and an image of the subject is formed by the CCD 5 at each of positions of the taking lens 3. The pixel data of the captured image is sequentially scanned every row in the matrix Amn which is set in the captured image, is outputted from the CCD 5 to the elements 7, 9, 11 and 13A, and processed.

At this time, in the AF evaluation value calculating unit 13A, as described above, by the control of the CPU 29, for pixel data of a captured image supplied every row of the matrix Amn, the accumulators H0 to H3 of the same number as that of columns (four in this case) are used to calculate the AF evaluation values for each of the AF areas Am0, Am1, Am2 and Am3 of the row to which the captured image is supplied. The calculated AF evaluation value is outputted from the D flip flop circuit 39 to the DMA FIFO controller 17*a* before pixel data of the next row is supplied. In such a manner, the AF evaluation value in each of the AF areas Amn (m, n=0 to 3) of an image captured in each lens position is calculated.

Each of the AF evaluation values outputted to the DMA FIFO controller 17*a* is transmitted from the DMA FIFO controller 17*a* via the DMA channel ch0 to the main memory 19 and stored. In such a manner, all of the AF evaluation values of the AF areas Amn (m, n=0 to 3) of an image captured at each lens position are stored into the main memory 19. Like in the conventional technique, the AF evaluation value is associated with the lens position of the taking lens 3 at which the AF evaluation value is obtained and stored into the main memory 19.

When an operation of designating one of the AF areas (for example, AF area A11) is instructed via the operation unit 31, by the CPU 29, the maximum value among the AF evaluation values in the designated AF area A11 of each captured image is detected from the main memory 19, the lens position (focus position) associated with the detected AF evaluation value is detected, and the taking lens 3 is positioned to the detected lens position (that is, focus position) via the lens driving unit 25.

When the operation of image capturing is instructed via the operation unit 31, the CCD 5 is controlled by the CPU 29 via the timing generator 27, and an image of the subject incident via the taking lens 3 is captured. The image data of the captured image is outputted from the CCD 5 and processed sequentially by the elements 7, 9, 11 and 15.

At this time, the image processing unit 15 performs an interpolating process or the like, thereby generating image data. Original image data outputted from the CCD defective pixel interpolating unit 11 and image data outputted from the image processing unit 15 is outputted to the DMA FIFO controllers 17*b* and 17*c*, transmitted from the elements 17*b* and 17*c* via the DMA channels ch0 and ch1 to the main memory 19 and stored.

As described above, in the AF evaluation value calculating device (13A, 17*a* and ch0) according to the embodiment, the AF evaluation value calculated by the AF evaluation value calculating unit 13A is transmitted from the AF evaluation value calculating unit 13A to the main memory 19 by the data transmitter (17*a* and ch0). Consequently, the processing power of the CPU 29 which performs the AF control is prevented from being consumed by transmission of the AF evaluation value, and deterioration in speed of the AF control can be prevented.

Moreover, since the data transmitter (17*a* and ch0) is a DMA, it is easily configured.

Further, the calculated AF evaluation value is stored into the main memory 19 of the digital camera 1, that is, the main memory 19 also serves as a memory for storing the AF evaluation value. Consequently, the memory space can be reduced (that is, increase in the size of the AF evaluation value calculating device can be prevented) and, even when the number of AF evaluation values increases, shortage in the memory can be prevented. Therefore, even when a number of AF areas Amn (m, n=0 to 3) are set and the so-called "whole area scan method" is employed as in the embodiment, both the smaller AF evaluation value calculating device and higher speed of the AF control of the digital camera 1 can be realized.

Further, the accumulators H0 to H3 of the same number as that of the columns of the matrix Amn are provided, an image is sequentially scanned every row of the matrix Amn and supplied to the AF evaluation value calculating unit 13A, pixel data of an image supplied every row of the matrix Amn via the filter PF is integrated in each of the AF areas Am0, Am1, Am2 and Am3 of the row supplied by the accumulators H0 to H3, the AF evaluation value in each of the AF areas Am0 to Am3 of the row is calculated, and the calculated AF evaluation value is outputted to the element 17*a* before the pixel data of the image included in the next row is supplied. Consequently, the AF evaluation values of all of the AF areas Amn (m, n=0 to 3) can be calculated by the accumulators H0 to H3 of the same number as that of the columns of the matrix Amn. Therefore, even when a number of AF areas are set, the number of accumulators may be small, and increase in the size of the AF evaluation value calculating device and power consumption can be prevented.

Further, only one adder K for integration is provided and used in a time sharing manner for calculation of the AF evaluation values in the AF areas Am0, Am1, Am2 and Am3 of the row supplied. Thus, the AF evaluation values in the AF areas Am0 to Am3 in the row can be calculated. It can contribute to prevention of increase in the size of the AF evaluation value calculating device and increase in power consumption.

In the digital camera 1 constructed as described above, by effects of the AF evaluation value calculating device, even when a number of AF areas are set, increase in size and power consumption can be prevented. Since a number of AF areas can be set, there is an advantage that optimum AF can be performed in accordance with the position on an image of a subject.

At the time of outputting the calculated AF evaluation value from the D flip flop circuit 39 to the DMA FIFO controller 17*a* in the embodiment, it is also possible to output only high order bits (the remaining portion of the AF evaluation value which is rounded) of the AF evaluation value may be outputted to the DMA FIFO controller 17*a*. In such a manner, the amount of data to be transmitted can be reduced, the transmission speed can be improved, and a storage area of the AF evaluation value in the main memory 19 can be reduced.

First Modification

Figure 4:
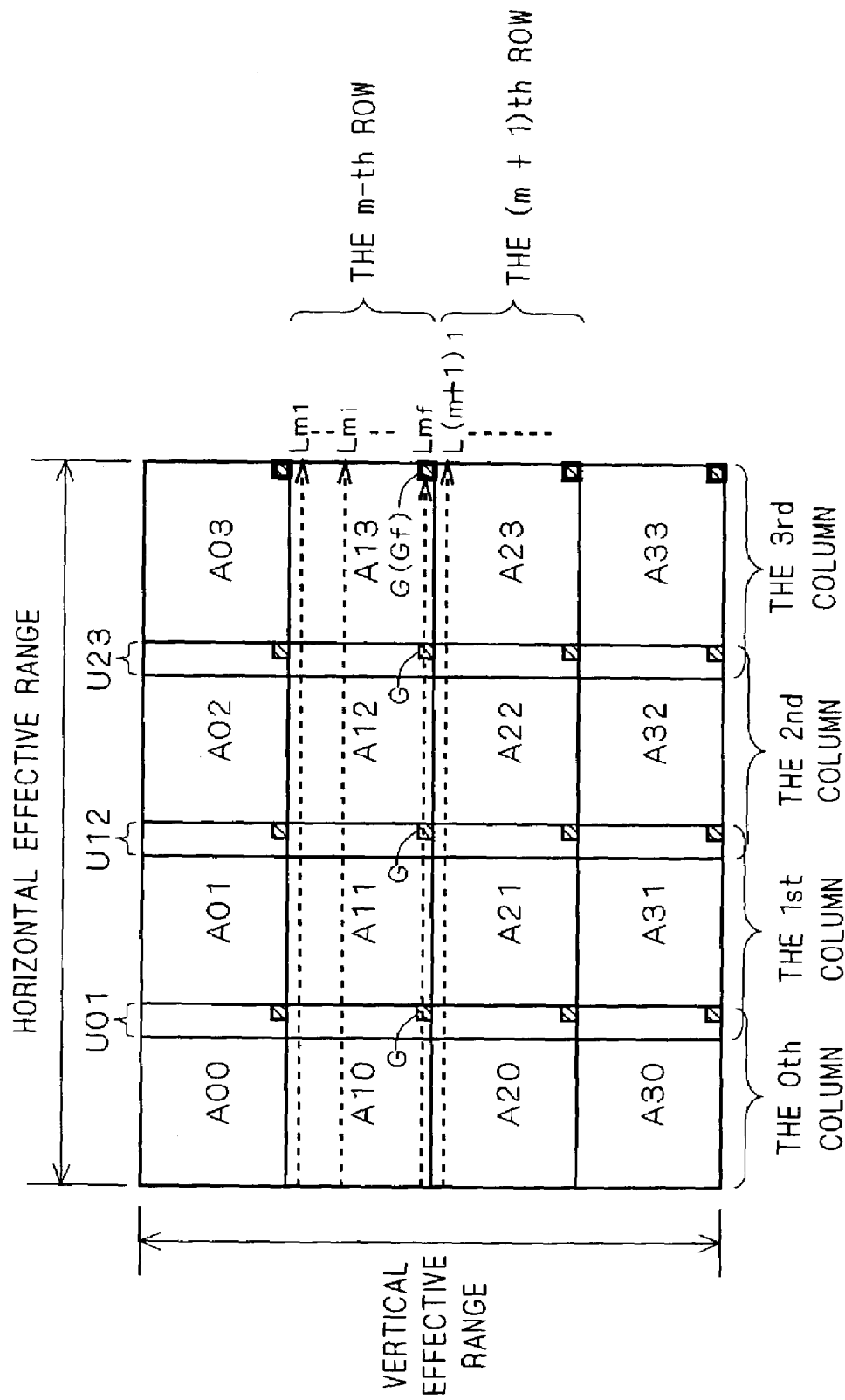
FIG. 4 is a diagram showing an example of setting an AF area in a first modification.

Although the case where the AF areas Amn (m, n=0 to 3) are set so as not to be superposed with each other has been described in the foregoing embodiment, particularly, the AF areas Am0, Am1, Am2 and Am3 in the same row may be set so as to be superposed with each other as shown in FIG. 4 for example. An AF evaluation value calculating unit 13B in this case is constructed as shown in FIG. 5.

Figure 5:
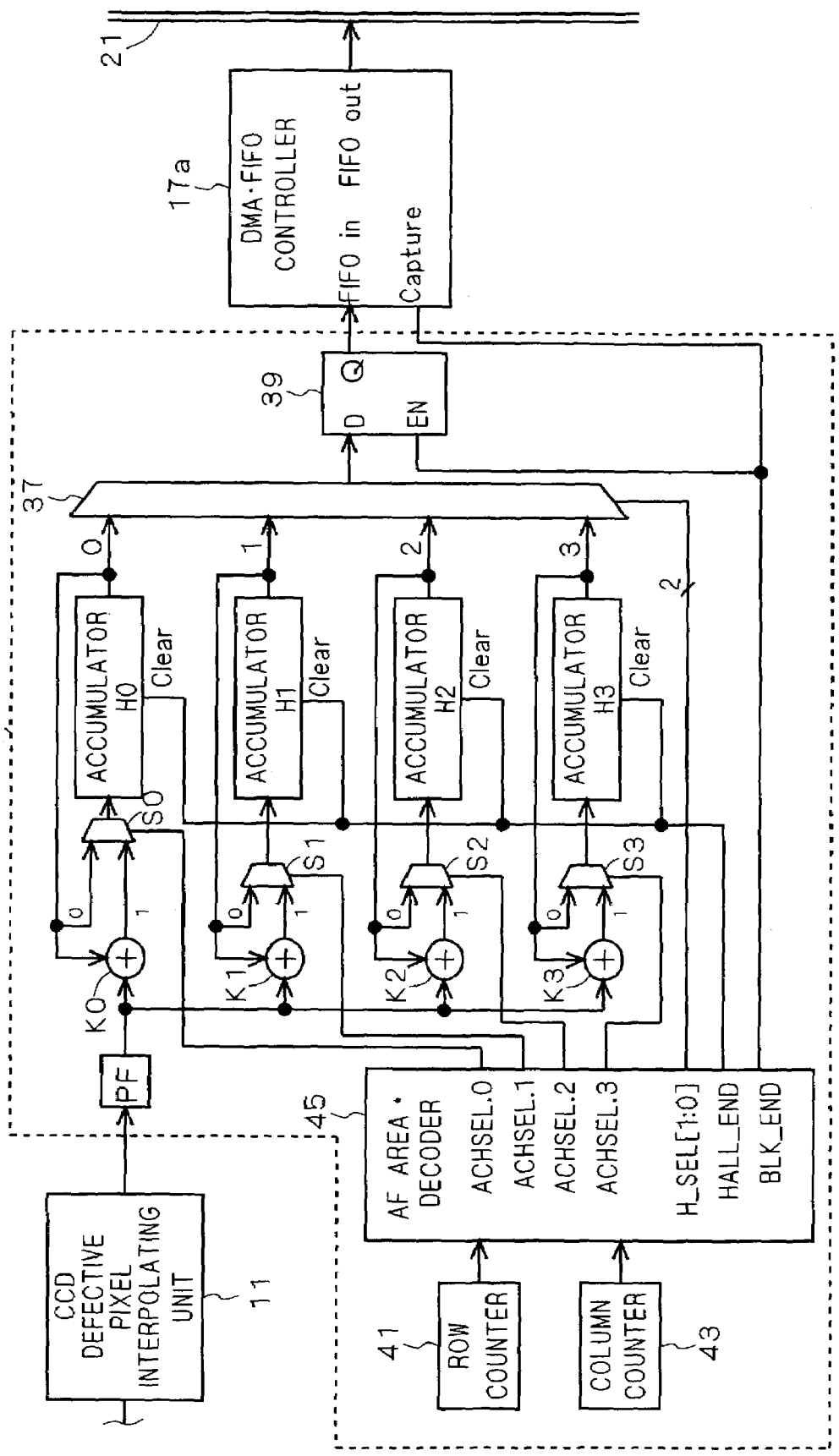
FIG. 5 is a schematic configuration diagram of an AF evaluation value calculating unit in the first modification.

As shown in FIG. 5, the AF evaluation value calculating unit 13B is largely different from the AF evaluation value calculating unit 13A of FIG. 2 with respect to the point that adders K0, K1, K2 and K3 are provided at the ante stage of the selectors S0, S1, S2 and S3, respectively. More specifically, the AF evaluation value calculating unit 13B is constructed similar to the AF evaluation value calculating unit 13A except for the point that the filter PF outputs the contrast value of each pixel extracted to the adders K0 to K3, the accumulator H0 (H1, H2 or H3) outputs an integrated value stored therein to the selectors 37 and S0 (S1, S2 or S3) and the adder K0 (K1, K2 or K3), and the adder K0 (K1, K2 or K3) adds the contrast value from the filter PF and the integrated value from the accumulator H0 (H1, H2 or H3) and outputs the resultant as a new integrated value to the selector S0 (S1, S2 or S3).

The operation of the AF evaluation value calculating unit 13B will now be described. Referring to FIG. 4, by the control of the AF area decoder 45, the elements S0 to S3, H0 to H3, 37 and 39 operate as follows each time pixel data included in the AF area Am0 (Am1, Am2 or Am3) out of pixel data on the horizontal line $Lm_i$ of the m-th row of the matrix Amn is outputted from the filter PF to each of the adders K0 to K3 during the period in which the pixel data is outputted.

Specifically, referring to FIG. 5, the accumulators H0, H1, H2 and H3 are not cleared and output the integrated value to the selector 37, the selectors S0, S1, S2 and S3 at the ante stage of the accumulators, H0, H1, H2 and H3, and the adders K0, K1, K2 and K3, respectively. Consequently, by the adders K0, K1, K2 and K3, the integrated values from the accumulators H0, H1, H2 and H3 at the post stage and the contrast value from the filter PF are integrated, respectively. The new integrated values are outputted to the selectors S0, S1, S2 and S3 at the post stage. The selector S0 (S1, S2 or S3) selects an integrated value from the adder K0 (K1, K2 or K3) and outputs it to the accumulator H0 (H1, H2 or H3). On the other hand, the selectors S0 to S3 other than the selector S0 (S1, S2, S3) select the integrated values from the accumulators H0, H1, H2 and H3 at the post stage and output them to the accumulators H0, H1, H2 and H3 at the post stage, respectively. Both of the selector 37 and the D flip flop circuit 39 stop outputting signals.

By the operation, the contrast values of pixels included in the AF area Am0 (Am1, Am2 or Am3) on the horizontal line $Lm_i$ of the m-th row are integrated and stored into the accumulator H0 (H1, H2 or H3). For example, in an area U01 in which the AF areas Am0 and Am1 on the horizontal line $Lm_i$ of the m-th row are superposed with each other, integration in the AF area Am0 and integration in the Am1 are performed in parallel (similarly in areas U12 and U23). Similar operation is repeated on each of horizontal lines from the start line $Lm_l$ to the final line $Lm_f$ of the m-th row, thereby integrating contrast values of all of pixels included in the AF area Am0 (Am1, Am2 or Am3) of the m-th row and storing the integrated value into the accumulator H0 (H1, H2 or H3).

When the contrast value of the final pixel G of the AF area Am0 (Am1, Am2 or Am3) on the final line $Lm_f$ of the m-th row is outputted from the filter PF to the adders K0 to K3, the selector 37 selects the integrated value from the accumulator H0 (H1, H2 or H3) and outputs it to the D flip flop circuit 39. The D flip flop circuit 39 outputs the integrated value from the accumulator H0 (H1, H2 or H3) outputted from the selector 37 as an AF evaluation value in the AF area Am0 (Am1, Am2 or Am3) to the DMA FIFO controller 17a.

Further, when pixel data of the final pixel Gf(G) of the final line $Lm_f$ of the m-th row is outputted from the filter PF to each of the adders K0 to K3, the integrated value stored in each of the accumulators H0, H1, H2 and H3 is cleared and the zero value is outputted to the adders K0, K1, K2 and K3 and the selectors S0, S1, S2 and S3 at the ante stage and the selector 37. By the operation, calculation of the AF evaluation values in the AF areas Am+10, Am+11, Am+12 and Am+13 in the next (m+1)th row is prepared.

The above operation is repeated on each of the 0th to 3rd rows of the matrix Amn, thereby calculating the AF evaluation values in all of the AF areas Amn (m, n=1 to 3) which are set in a captured image.

By providing the adders K0, K1, K2 and K3 for integration for the accumulators H0, H1, H2 and H3, respectively, the integrating process can be executed in the AF areas Am0, Am1, Am2 and Am3 in the same row in parallel. Consequently, there is an advantage that the AF areas Am0 to Am3 of the same row can be set so as to be superposed with each other.

In the first modification, the D flip flop circuit 39 may not be provided.

Second Modification

Figure 6:
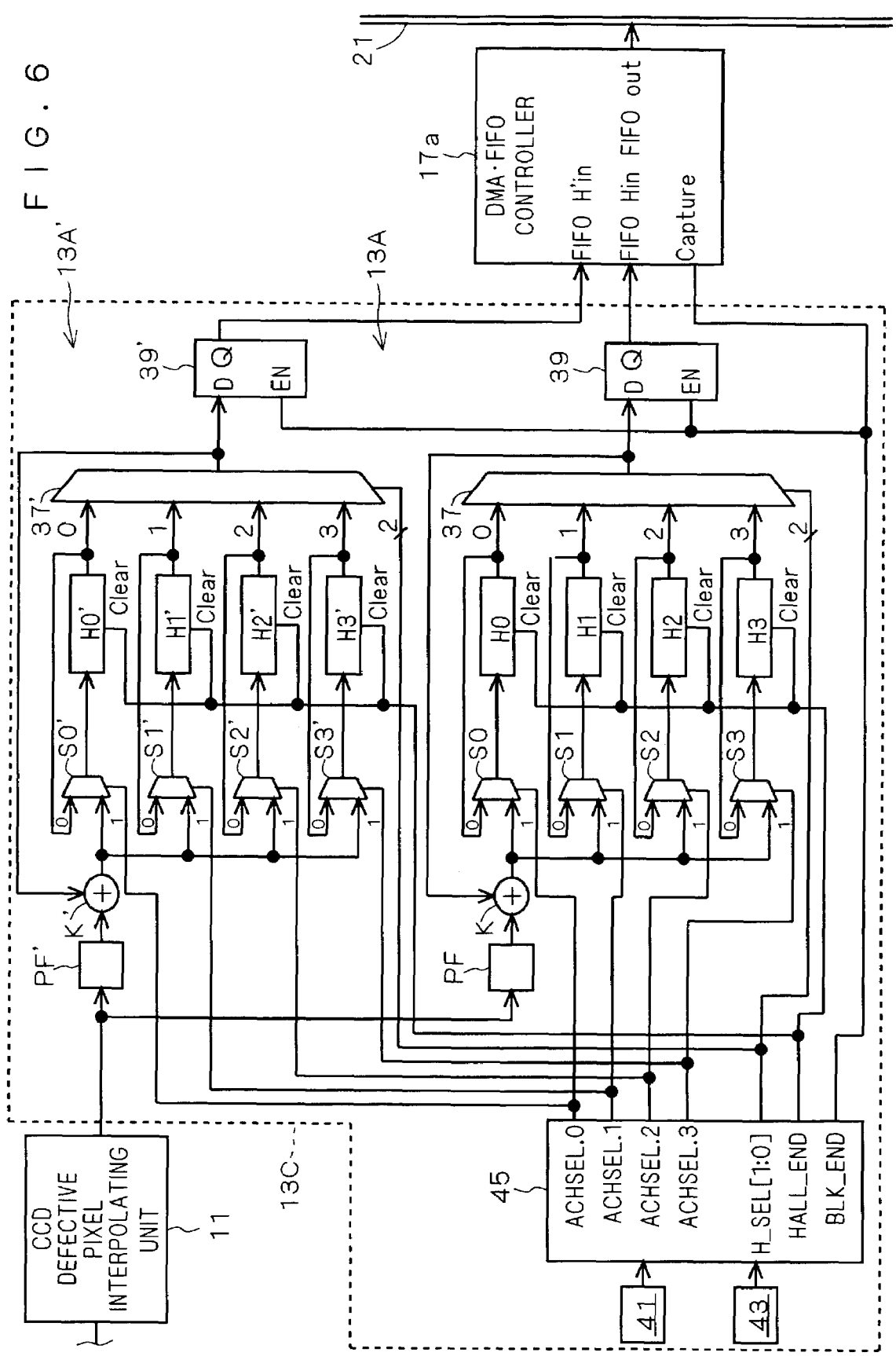
FIG. 6 is a diagram showing an example of a schematic configuration of an AF evaluation value calculating unit in a second modification.

The foregoing embodiment has been described with respect to the case of calculating one AF evaluation value for one AF area. However, it is also possible to calculate a plurality of AF evaluation values of different characteristics for one AF area. FIG. 6 is a diagram showing an example of the configuration of the AF evaluation value calculating unit in the case of calculating two AF evaluation values of different characteristics for one AF area.

An AF evaluation value calculating unit 13C is mainly constructed by, as shown in FIG. 6, connecting two AF evaluation value calculating units 13A (which will be referred to as 13A and 13A') of FIG. 2 in parallel. More specifically, in the AF evaluation value calculating unit 13C, the AF area decoder 45, row selector 41 and column selector 43 are commonly used by the AF evaluation value calculating units 13A and 13A'. Each of the AF evaluation calculating units 13A and 13A' is constructed in a manner similar to the AF evaluation value calculating unit 13A of FIG. 2 except that the filter PF on the AF evaluation value calculating unit 13A side takes the form of a high pass filter whereas the filter PF' on the AF evaluation value calculating unit 13A' side takes the form of a band pass filter.

The operation of the AF evaluation value calculating unit 13C will now be described. In the AF evaluation value calculating unit 13C, pixel data from the CCD defective pixel interpolating unit 11 is outputted to both the filters PF' and PF. From the pixel data outputted to the filter PF', an intermediate frequency response component (which becomes a contrast value) is extracted by the filter PF'. On the basis of the intermediate frequency response component, in a manner similar to the case of the AF evaluation value calculating unit 13A in FIG. 2, the AF evaluation value in each of all of AF areas Amn (m, n=0 to 3) is calculated and outputted to the DMA FIFO controller 17a. In parallel with this, from the pixel data outputted to the filter PF, a high frequency response component (which becomes a contrast value) is extracted by the filter PF. On the basis of the high frequency response component, in a manner similar to the case of the AF evaluation value calculating unit 13A of FIG. 2, the AF evaluation value in each of all of the AF areas Amn (m, n=0 to 3) is calculated and outputted to the DMA FIFO controller 17a. As described above, in the configuration, two AF evaluation values based on the frequency response components of different bandwidths are calculated with respect to one AF area.

In the case of calculating three or more AF evaluation values for one AF area, it is sufficient to connect three or more AF evaluation value calculating units 13A with reference to the case of calculating two AF evaluation values.

By calculating a plurality of AF evaluation values of different characteristics for one AF area and selectively using the plurality of AF evaluation values of difference characteristics in accordance with the subject, the optimum focus position can be obtained according to the subject.

In the modification, by extracting the frequency response components of bandwidths which are different from each other in the filters PF and PF', the AF evaluation values calculated by the AF evaluation value calculating units 13A and 13A' can have different characteristics. However, the present invention is not limited to the method of providing the AF evaluation values with different characteristics.

For example, by employing different computing methods (for example, an integrated value of differences or a sum of square of a difference) used for extracting the frequency response component by the filters PF and PF', the AF evaluation values may have different characteristics. Alternately, the AF evaluation values may have different characteristics by, for example, providing the filters PF and PF' each for extracting a frequency response component with different pixel correlation characteristics (such as characteristic of extracting a frequency response component on the basis of correlation between pixels in the vertical direction, characteristic of extracting a frequency response component on the basis of correlation between pixels in the horizontal direction, characteristic of extracting a frequency response component on the basis of correlation between pixels in an oblique direction, characteristic of extracting a frequency response component on the basis of correlation between pixels which are symmetrical with each other with respect to a point or, more generally, characteristic of extracting a frequency response component on the basis of correlation between two-dimensional pixels). In any of the cases, similar effects are produced.

Figure 7:
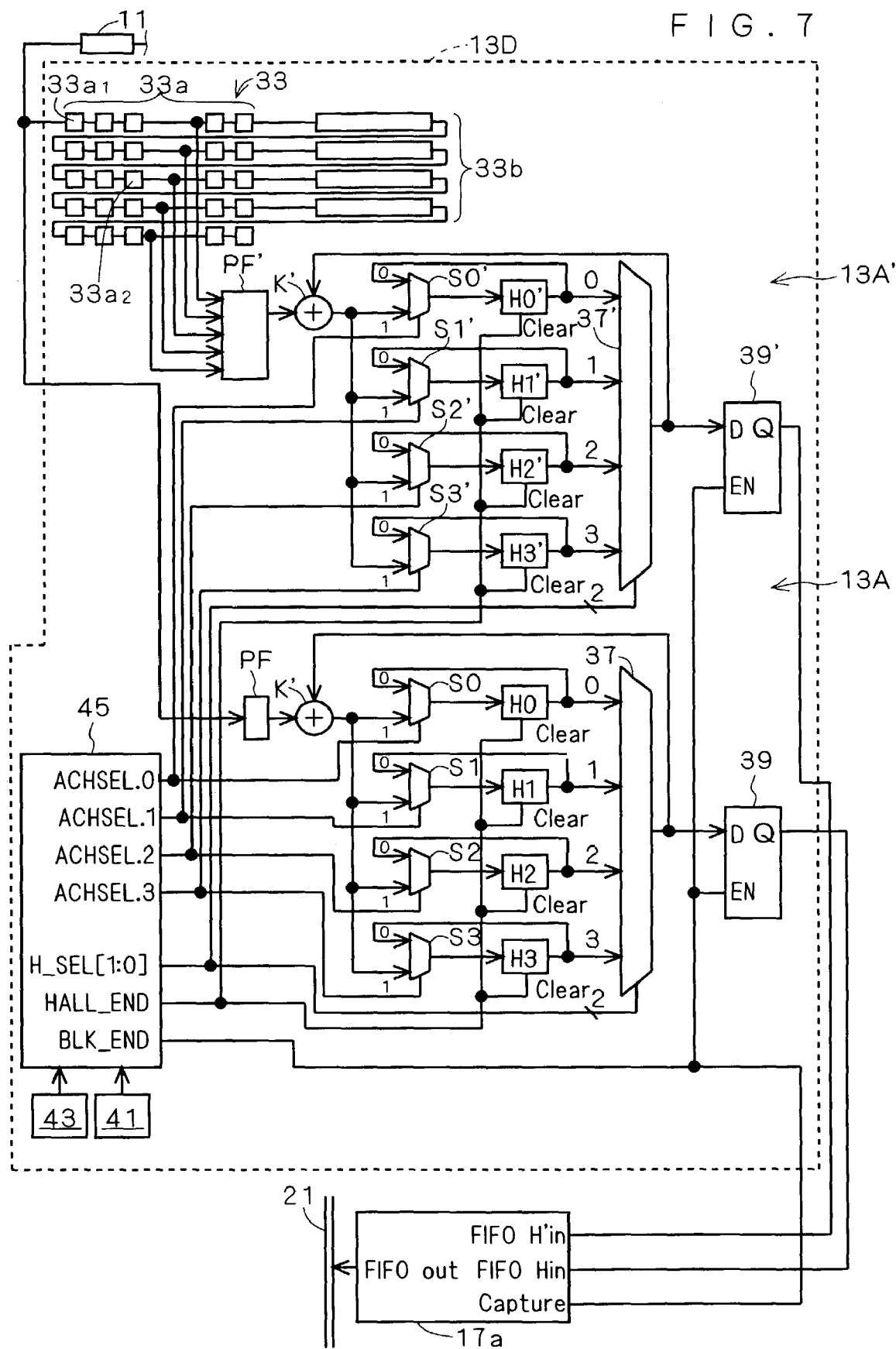
FIG. 7 is a diagram showing another example of the schematic configuration of the AF evaluation value calculating unit in the second modification.
Figure 8:
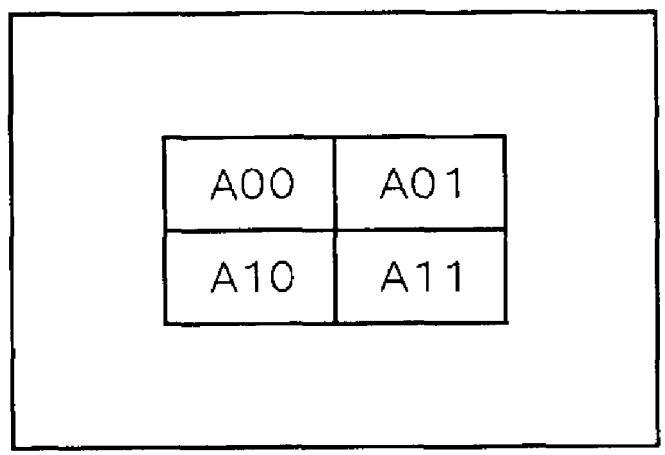
FIG. 8 is a diagram showing an example of the case where four AF areas are set in a screen.
Figure 9:
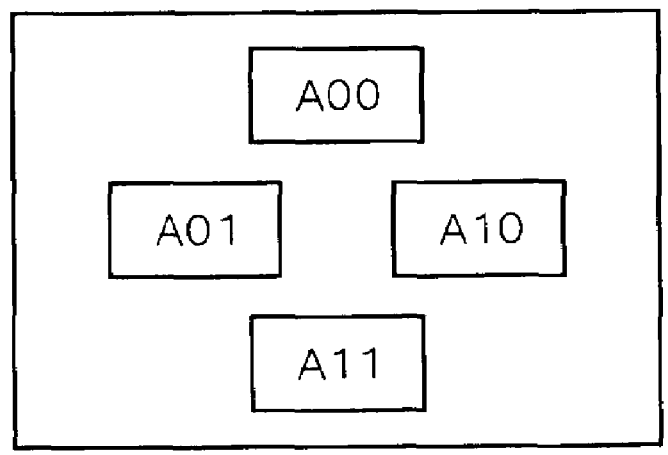
FIG. 9 is a diagram showing another example of the case where four AF areas are set in a screen.

The AF evaluation value calculating unit 13D of FIG. 7 uses, as the filter PF in the AF evaluation value calculating unit 3C of FIG. 6, a high pass filter for extracting high frequency response components on the basis of correlation between pixels in the vertical direction and, as the filter PF', a high pass filter for extracting high frequency response components on the basis of correlation of pixels in the horizontal direction.

Reference numeral 33 in FIG. 7 denotes a register group (register) provided for the filter PF', which is constructed by connecting, for example, 5×5 registers 33a in series via, for example, four line memories 33b at a number of stages. In the register group 33, each time pixel data from the CCD defective pixel interpolating unit 11 is sequentially input to a register $33a_1$, pixel data stored in each register 33a and each line memory 33b is sequentially shifted to the register 33a or line memory 33b at the post stage. By the operation, pixel data in the area of 5×5 pixels around each pixel in a captured image as a center is sequentially stored into the 5×5 registers 33a. By using pixel data of five pixels of a pixel (target pixel) sequentially stored into the register $33a_2$ and two upper pixels and two lower pixels of the register $33a_2$ (that is, the target pixel), the filter PF' extracts a high frequency response component in the target pixel.

Generally, the filter PF' for extracting a high frequency response component on the basis of correlation between pixels in the vertical direction (similarly, correlation between pixels in an oblique direction, correlation between pixels which are symmetrical with each other with respect to a point (which should include correlation between pixels in the vertical direction) or, more generally, correlation between two-dimensional pixels) has such a register group 33. The register group 33 is usually used also in the image processing unit 15 at the time of performing a pixel interpolating process of interpolating pixel data of each pixel (target pixel) in a captured image from pixel data of pixels surrounding the target pixel, in order to temporarily store pixel data of, for example, a 5×5 pixel area using the target pixel as a center. Consequently, when a filter for extracting a high frequency response component on the basis of, for example, correlation between pixels in the vertical direction is used as the filter PF', the register group 33 used by the filter PF' may also serve as the register group used for the pixel interpolating process of the image processing unit 15.

For example, at the time of performing the pixel interpolating process in the image processing unit 15, the register group on the image processing unit 15 side may be omitted and the pixel interpolating process may be performed by using pixel data of the 5×5 pixel area temporarily stored in the register 33a of the register group 33 on the filter PF' side. In such a manner, the register group on the image processing unit 15 side can be omitted, so that reduction in size and power consumption of the digital camera 1 can be realized.

Similarly, also in the case of the AF evaluation value calculating unit 13A of FIG. 2, when a filter for extracting a frequency response component on the basis of, for example, correlation between pixels in the vertical direction is used as the filter PF, the register group 33 may be shared with image processing unit. In this case as well, similar effects are obtained.

While the invention has been shown and described in detail, the foregoing description is in all aspects illustrative and not restrictive. It is therefore understood that numerous modifications and variations can be devised without departing from the scope of the invention.

What is claimed is:

1. An AF evaluation value calculating device for calculating an AF evaluation value used for AF (auto-focus) control of a digital camera, compnsing:
   at least one AF evaluation value calculator for calculating an AF evaluation value in each of a plurality of AF areas which are set in an image area of image data supplied; and
   a data transmitter for transmitting said AF evaluation value calculated by said AF evaluation value calculator to a predetermined memory by DMA (Direct Memory Access), wherein
   said plurality of AF areas are set in a matrix, and
   said AF evaluation value calculator includes:
   accumulators of the same number as the number of colunms of said matrix;
   a filtering part for extracting a predetermined frequency response component from said image data supplied; and
   a processor for interating said image data supplied via said filtering part in each of said AF areas of a row by using said accumulators to calculate said AF evaluation value in each of said AF areas of the row and, before said image data included in the next row is supplied, outputting said AF evaluation value calculated to said data transmitter.

2. The AF evaluation value calculating device according to claim 1, wherein
   said memory is a main memory for temporarily storing a captured image, which is provided for said digital camera.

3. The AF evaluation value calculating device according to claim 1, wherein
   said processor outputs only high order bits of each of said calculated AT evaluation values to said data transmitter and transmits the high order bits to said memory via said data transmitter.

4. The AF evaluation value calculating device according to claim 1. wherein
   said processor has one adder for integration and uses the adder to calculate said AF evaluation value in each of said AF areas in a time sharing manner.

5. The AF evaluation value calculating device according to claim 1. wherein
   said processor has an adder for integration for each of said accumulators.

6. The AF evaluation value calculating device according to claim 1, wherein
at least one AF evaluation value calculator includes a plurality of AF evaluation value calculators, and
said AT evaluation value calculators have filtering parts for extracting a frequency response component from said image data supplied by computing methods which are different from each other, and calculate said AF evaluation values of different characteristics by using the frequency response components extracted by the filtering parts.

7. The AF evaluation value calculating device according to claim 1, wherein
at least one AF evaluation value calculator includes a plurality of AF evaluation value calculators, and
said AF evaluation value calculators have filtering parts for extracting frequency response components of bandwidths which are different from each other from said image data supplied, and calculate said AF evaluation values of different characteristics by using the frequency response components extracted by the filtering parts.

8. The AF evaluation value calculating device according to claim 1, wherein
at least one AF evaluation value calculator includes a plurality of AlE evaluation value calculators, and
said AF evaluation value calculators have filtering parts for extracting frequency response components from said image data supplied by using the filters having pixel correlation characteristics which are different from each other, and calculate said AF evaluation values of different characteristics by using the frequency response components extracted by the filtering parts.

9. The AlE evaluation value calculating device according to claim 1, wherein
said filtering part has a register for temporarily storing said image data supplied, and
said register also serves as a register for temporarily storing a captured image used by an image process of said digital camera.

* * * * *